United States Patent Office 3,377,267
Patented Apr. 9, 1968

3,377,267
VAPOR-LIQUID PHASE SEPARATION OF HYDRO-
CONVERSION PROCESS EFFLUENT WITH THE
USE OF HYDROGEN AND STEAM
Byron G. Spars, Mill Valley, Calif., assignor to Chevron
Research Company, San Francisco, Calif., a corpora-
tion of Delaware
Filed Aug. 6, 1965, Ser. No. 477,829
6 Claims. (Cl. 208—108)

This invention relates to a method of separating a hydroconversion process effluent into vapor and liquid phases. More particularly, the invention relates to a process for separating the effluent from the hydroconversion of a residual oil feed into vaporized reaction products and unconverted liquid hydrocarbon fractions at elevated temperatures and pressures.

One of the problems in the hydroconversion of petroleum residua and high end point distillates, is to separate from the resulting effluent substantially all the vaporized hydrocarbons containing most of the desired reaction products, i.e., hydrocarbons generally boiling below about 950° F. Methods for such a separation include equilibrium flash and stripping operations. The separation is made at substantially the hydroconversion process temperatures and pressures so that the resulting substantially vapor-free unconverted hydrocarbon fractions can be recycled for further hydroconversion without the necessity for depressuring, cooling, repressuring and reheating these unconverted materials.

The hydroconversion process including the subsequent separation step is carried out in the presence of about 1,000–10,000 s.c.f. hydrogen per barrel of feed. Equilibrium flash operations in the presence of this amount of hydrogen, which is the amount required to sustain the hydroconversion reactions, result in a very poor recovery of vaporized poducts boiling below about 950° F. Additional quantities of products can be recovered by stripping the hydroconversion effluent with additional quantities of hydrogen. Hydrogen stripping results in new problems because large amounts of hydrogen recycle gas, normally about 20,000–30,000 s.c.f. hydrogen per barrel of effluent, are required in order to obtain near 100% recovery of the products in the effluent boiling below about 950° F. In such stripping operations, the hydrogen-containing overhead gas must be cooled to condense the normally liquid hydrocarbon product. Large volumes of hydrogen must then be compressed and recirculated through the stripping zone. The use of such excessive amounts of hydrogen for stripping over that required to sustain the hydroconversion reaction in turn necessitates the use of larger high pressure equipment such as heat exchangers, compressors, furnaces and separation vessels. It would be desirable if a process were available for separating the vaporized products from the hydroconversion effluent with much smaller amounts of hydrogen recycle gas than are required in prior art processes.

In view of the foregoing prior art problems, an object of the present invention is to provide an economical process for separating the effluent from the hydroconversion of residual oils in vaporized products and unconverted liquid.

It is a further object of the present invention to provide a process for separating the vaporized products from the hydroconversion effluent with smaller amounts of hydrogen recycle gas than previously required to obtain the same product recovery.

In accordance with a specific embodiment of the present invention, there is provided, in a process for converting a heavy hydrocarbon feed to lower boiling product by subjecting the feed and at least 1000 s.c.f. of hydrogen per barrel of feed to an elevated temperature at an elevated pressure in a hydroconversion zone and recovering from the effluent from the hydroconversion zone, products boiling below about 950° F. and higher boiling materials at least a portion of which is recycled to the hydroconversion zone, the improvement wherein the effluent from the hydroconversion zone is passed into a separation zone at substantially the same temperature as that in the hydroconversion zone and at a pressure only slightly lower than that of the hydroconversion zone, and wherein from about 6 to about 60 pounds of steam per barrel of normally liquid effluent are introduced into the separation zone. A vapor mixture comprising hydrogen, steam and the hydrocarbon products is withdrawn from the upper part of the separation zone and high boiling liquid hydrocarbons are withdrawn from the lower part of the separation zone. At least a portion of the liquid hydrocarbons is recycled to the hydroconversion zone.

The conditions are controlled in the hydroconversion zone to prevent the formation of or to produce no more than 1 weight percent solid materials, including coke, coke precursors and other materials which are insoluble in benzene. Hydroconversion process streams containing greater than about 1 weight percent of such solid materials tend to plug process lines, valves, furnace tubes and other equipment as well as to coke the catalytic or noncatalytic solids used to aid in the hydroconversion reaction.

The separation zone may be any of the devices commonly used to separate the vaporized products from the effluent such as a flash drum or a stripping column. A suitable recovery of the products boiling below about 950° F. may be obtained with a flash drum if the hydrogen-rich gas rate to the flash drum is sufficiently high, i.e., 4,000–8,000 s.c.f. per barrel of normally liquid effluent. At a low gas rate, i.e., 2,000–4,000 S.C.F. per barrel, the flash drum bottoms may be passed to a stripping column to obtain a greater recovery of the products. Alternately, the hydroconversion effluent may be passed directly to the stripping column.

The hydroconversion of the hydrocarbon feed may be done by any one or a combination of the following processes, well known in the art, which are operable at conditions in the range of about 700°–950° F., 1000–5000 p.s.i.g. and a hydrogen recycle rate of 1,000–10,000 s.c.f. per barrel of total liquid hydroconversion feed:

Thermal hydrocracking is cracking in the presence of hydrogen in a tubular heating coil or a combination heating and soaking coil and may be done in the presence of noncatalytic solids such as alundum particles. Hydrovisbreaking is like thermal hydrocracking except that the level of conversion is usually less than thermal hydrocracking. Catalytic hydrocracking is cracking in the presence of a catalyst which normally contains a hydrogenating component selected from any one or more of the various Group VI and VIII metals and compounds thereof, and a support selected from such materials as silica, kieselguhr, silica-magnesia, alumina, silica-alumina, zirconia and titania, as well as various combinations of such materials. The preferred catalyst for the catalytic hydrocracking of residual oils comprises molybdenum or tungsten, their oxides or sulfides, together with an iron group metal such as cobalt or nickel, their oxides or sulfides, deposited or otherwise intimately associated with a cracking component that has no more than weak acidity such as silica-magnesia or alumina containing no more than minor amounts of silica-alumina. The temperatures used in catalytic hydrocracking heavy gas oils and residual oils are generally lower than those used in thermal hydrocracking, preferably in the range of 800°–875° F.

The petroleum oils used as feedstocks to the hydroconversion zone have end boiling points substantially above 950° F. Many of these feedstocks contain high molecular weight materials that cannot be distilled overhead even under vacuum without their decomposition. The feedstocks include heavy vacuum gas oils, reduced crude residuum, vacuum reduced crude residuum and residual portions thereof such as may be obtained by solvent extraction of residua.

This invention will be more clearly understood and further objects and advantages thereof will be apparent from the following description when read in conjunction with the accompanying drawings.

Figure 1:
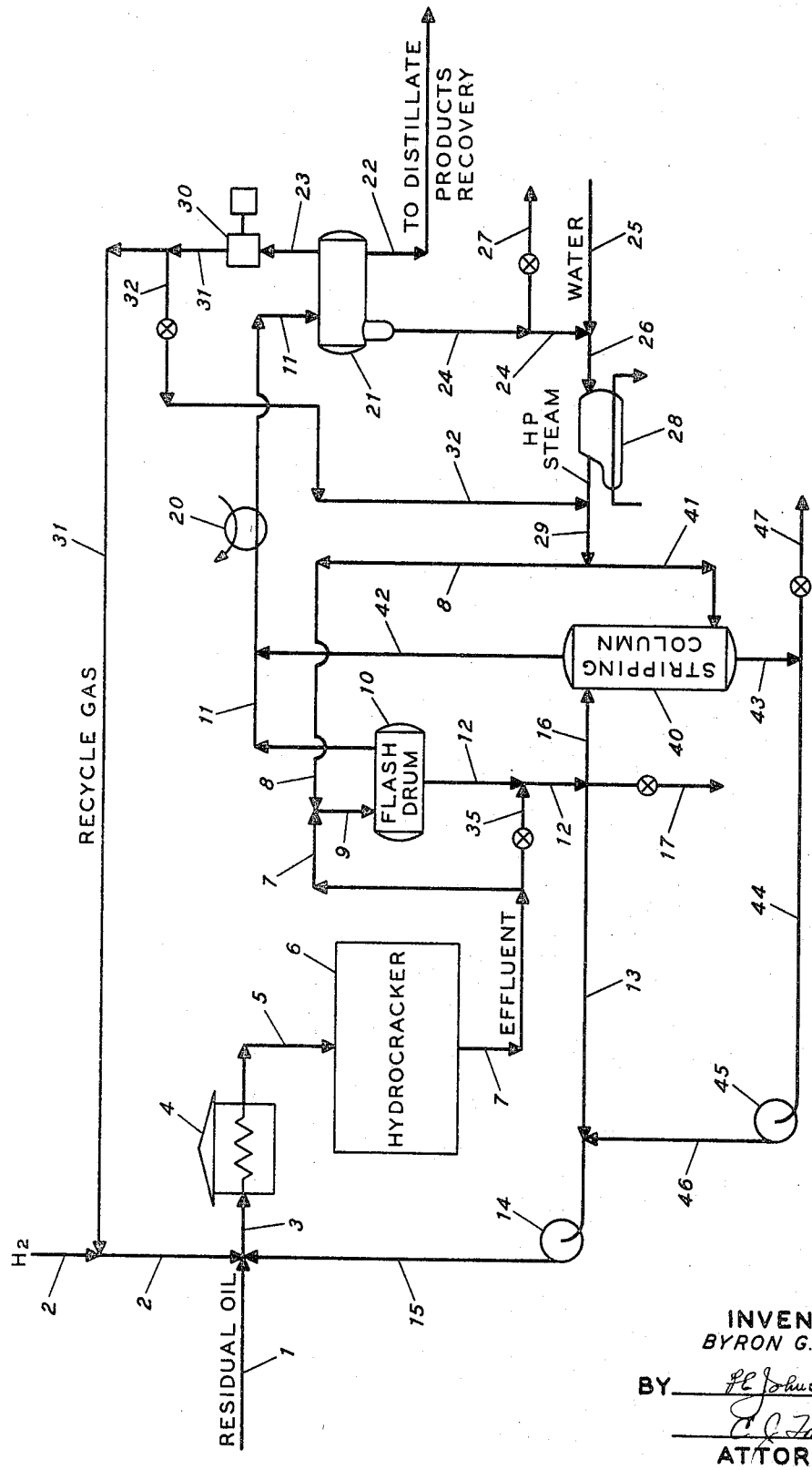
FIGURE 1 is a process flow diagram of process units and flow paths suitable for carrying out the process of the present invention.

Referring now to FIGURE 1, a residual oil feed, a portion of which boils above 950° F., is fed through line 1, combined with about 2,000–8,000 s.c.f. of a hydrogen-rich gas in line 2 per barrel of total liquid feed in line 3 and passed through line 3 to furnace 4 where the combined stream is heated to reaction temperature. The hydrogen-rich gas may be substantialy pure hydrogen, i.e., 90–100%, or it may be a gas mixture containing at least 50 volume percent hydrogen such as catalytic reformer hydrogen. The heated feed and hydrogen-rich gas are passed through line 5 to hydrocracker 6 wherein at least 10 volume percent of the portion of the total feed boiling above about 950° F. is converted to materials boiling below about 950° F.

Preferably, hydrocracker 6 is provided with at least one fixed bed of a sulfactive hydrogenation catalyst through which the residuum feed and hydrogen-rich gas pass. The operation condition includes temperatures of 700°–950° F., pressures of 1000–5000 p.s.i.g., and space velocities of 0.2–10 LHSV. The effluent from hydrocracker 6 is passed through line 7, combined with at least about 6 pounds of steam in line 8 per barrel of normally liquid effluent in line 7 and passed through line 9 to flash drum 10 operating at substantially the hydrocracker temperature and slightly less than the hydrocracker pressure. The temperature in flash drum 10 should be kept at least above the critical temperature of water, i.e., about 706° F. The pressure in the flash drum is no more than 50 p.s.i.g. less than the hydrocracker pressure. The concentration of the steam in the flash drum gas comprising the steam and hydrogen-rich gas is between about 1 and 35 volume percent.

The flash drum gas and the products separated from the effluent comprising the vaporized normally gaseous and normally liquid hydrocarbons boiling below about 950° F. are passed overhead from flash drum 10 through line 11. The liquid hydrocarbons are removed from the bottom of flash drum 10 through line 12. All or a portion of the flash drum bottoms is recycled to hydrocracker 6 by passing through line 13 and pump 14 which returns the bottoms to hydrocracker 6 via line 15. A portion of the flash drum bottoms may be removed from flash drum 10 through line 16 to further processing or it may be withdrawn from the system through line 17. The flash drum overhead in line 11 is passed through cooler 20 to high pressure separator 21. The flash drum overhead is cooled sufficiently to condense the normally liquid hydrocarbons contained therein and the condensed liquid is withdrawn from separator 21 and passed through line 22 to a recovery zone not shown for the recovery of distillate products boiling below about 950° F. The pressure in separator 21 is slightly lower than that employed in flash drum 10 and the temperature is sufficiently low, i.e., below 200° F., such that the hydrogen-rich gas in line 24 is free of water and normally liquid hydrocarbons.

The water condensate is removed through line 24, combined with make-up water through line 25 and passed through line 26 to steam generator 28. All or a portion of the water should be removed from the system through line 27 to avoid a buildup of $NH_3$ and $H_2S$. The resulting high pressure (H.P.) steam is removed from generator 28 through line 29. The hydrogen-rich gas in line 23 is compressed in compressor 30, recycled through line 31, combined with make-up hydrogen in line 2 and passed through line 2 to the residuum feed in line 1. A portion of the recycle gas in line 31 may be passed through line 32 and combined with the steam in line 29. The combined steam and hydrogen-rich gas may be passed through line 8, combined with the effluent in line 7 and passed through line 9 to flash drum 10.

Additional amounts of hydrocarbons boiling below about 950° F. may be recovered from the bottoms from flash zone 10 by passing the liquid through line 16 to the upper portion of stripping column 40. Stripping column 30 may contain contacting surfaces such as packing or trays and is operated at substantially the hydrocracker temperature and slightly less than the hydrocracker pressure. The stripping gas comprising the steam and hydrogen-rich in line 29 is passed through line 41 to stripping column 40 where it passes upward countercurrent to the liquid entering the upper portion of column 40. The concentration of the steam in the stripping gas is the same as that in the flash drum gas. The stripped hydrocarbons and the stripping gas are passed overhead from column 40 through line 42 and combined with the flash drum overhead in line 11. The stripped hydrocarbon liquid is removed from the bottom of column 40 through line 43. All or a portion of the stripped bottoms is recycled to extinction to hydrocracker 6 by passing through line 44 and pump 45 which passes the stripped bottoms line 44 and pump 45 which passes the stripped bottoms into the suction of pump 14 for return via line 15. A portion of the stripped bottoms may be withdrawn from the system through line 47 to prevent the buildup of metals, coke and other contaminants.

Alternatively all or a portion of hydrocracker 6 effluent may be passed through lines 7, 35, 12 and 16 to stripping column 40 without intermediate flash for separation as described in the preceding paragraph.

The following example more clearly illustrates the advantages of the process of the present invention.

EXAMPLE

A vacuum reduced crude oil feed, having the inspections indicated in Table I below, was combined with a residual recycle oil at a recycle to feed ratio of 4:1 and the combined feed was contacted in a fixed bed reactor containing a sulfided sulfactive hydrogenation catalyst comprising about 3 weight percent cobalt, 9 weight percent molybdenum deposited on alumina.

TABLE I

| Distillation (ASTM D1160), percent: | °F. |
|---|---|
| Start | 714 |
| 5 | 773 |
| 10 | 800 |
| 30 | 871 |
| 50 | 976 |
| 53 | 985 |
| Gravity, °API | 11.9 |
| Viscosity, SSU at: | |
| 130° F. | 15,760 |
| 210° F. | 656 |
| Sulfur, wt. percent | 1.16 |
| Nitrogen, wt. percent | 1.08 |
| Oxygen, wt. percent | 0.63 |
| Ramsbottom carbon, wt. percent | 7.1 |
| Sediment by extraction ASTM D473-59, wt. percent benzene insolubles | 0.03 |
| Nickel, p.p.m. | 80-86 |
| Vanadium, p.p.m. | 31-33 |
| Iron, p.p.m. | 74-80 |

Five runs were made at about 2900 p.s.i.g., 835° to 850° F. and about 2.5 LHSV at various hydrogen-rich gas rates, i.e., 3000-7000 s.c.f. per barrel of combined feed to the reactor as indicated in Table II below. The gas contained about 74 volume percent $H_2$. The reactor effluent in each run was combined with varying amounts of steam, i.e., from 0-3 weight percent steam, based on the weight of the combined feed to the reactor, and flashed in a flash drum at substantially the reactor temperature and pressure. Run 2 operated with extinction recycle. In all other runs a small portion of the liquid bottoms from the flash drum was bled from the system and the remaining portion was recycled to the reactor. Random samples of bottoms, analyzed for sediment by extraction, were found to contain less than 1 weight percent benzene insolubles. The flash drum overhead was partially condensed and separated in a high pressure separator into a hydrogen-rich gas and a water-containing hydrocarbon liquid fraction. Provisions were made for recycling a portion of the hydrogen-rich gas to the flash drum. However, in each of the five runs the hydrogen-rich gas was combined with make-up hydrogen and recycled to the reactor. Water containing $H_2S$ and $NH_3$ was separated from the high pressure liquid fraction and removed from the system. The water-free liquid fraction was separated in a low pressure separator into normally gaseous and normally liquid hydrocarbon fractions. The low pressure (L.P.) liquid fraction boiling below about 950° F. was removed from the system and the average LV percent L.P. liquid removed per pass over each of the run periods was recorded as shown in Table II. Table II shows the volume percent recovery which was calculated from the average LV percent L.P. liquid removed per pass, i.e., LV percent recovery=

$$\frac{\text{Avg. LV \% L.P. liquid removed per pass}}{\text{Volume percent 950° F.-hydrocarbons in effluent}} \times 100$$

Table II also shows the calculated LV percent per pass conversion obtained during each run. Conversion is the amount of the portion in the combined feed to the reactor boiling above 950° F. that is converted to materials boiling below 950° F.

Figure 2:
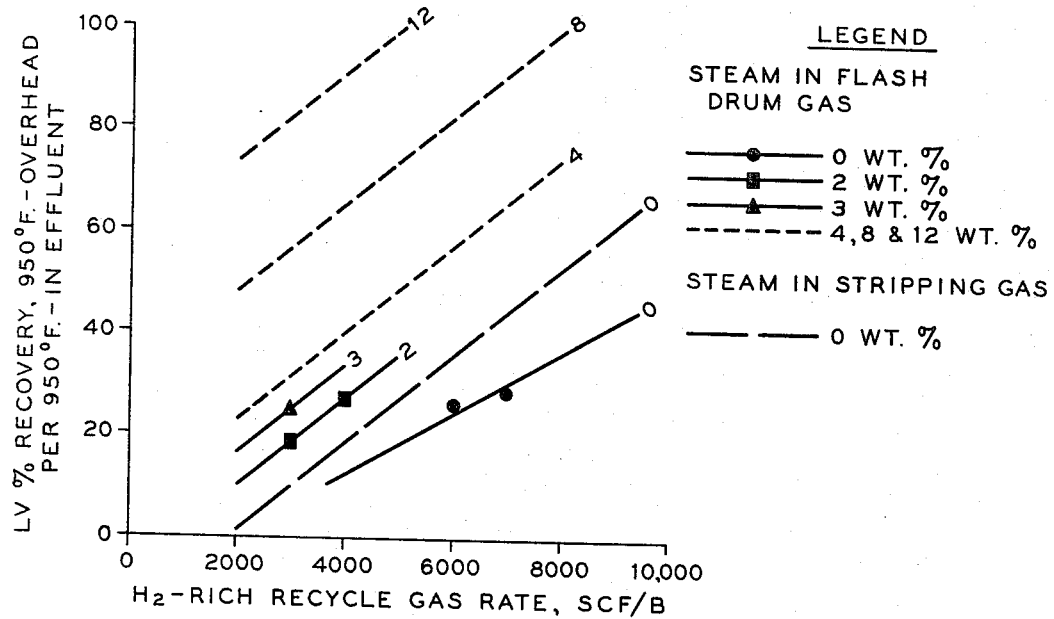
FIGURE 2 is a graph showing the effect an increase in the $H_2$-rich recycle gas rate has on the liquid volume percent (LV percent) recovery of the 950° F.-hydrocarbon fraction in the separation zone overhead with parameters of weight percent steam in the separation zone gas.

Referring now to FIGURE 2, the LV percent recovery data were plotted against the hydrogen-rich recycle gas rate in s.c.f. per barrel of normally liquid effluent. The solid circle data points represent Runs 1 and 2 when no steam was added to the flash drum gas. The solid square data points represent Runs 3 and 4 when 2 weight percent steam was added to the flash drum gas. The solid triangle data point represents Run 5 when 3 weight percent steam was added to the flash drum gas. An extension of these data to 4, 8 and 12 weight percent steam in the flash gas is represented by the dashed lines.

The LV percent recovery data obtained in the flash operation without steam were compared with recovery data obtained under similar conditions but with a hydrogen stripping column replacing the flash drum. The comparison indicated that about 50 LV percent greater recoveries were obtained with a stripping column than with a flash drum. This is represented in FIGURE 2 by the broken line between the 0 and 2 weight percent steam in flash drum gas lines. FIGURE 2 indicates that, by the addition of at least 2 weight percent steam to the flash drum gas, a greater recovery is obtained for the same recycle gas rate than by operating either a flash drum or a stripping column in the absence of steam. Even greater recoveries may be obtained if steam is added to the hydrogen-rich stripping gas and the resulting steam-containing stripping gas is used in a stripping column.

Figure 3:
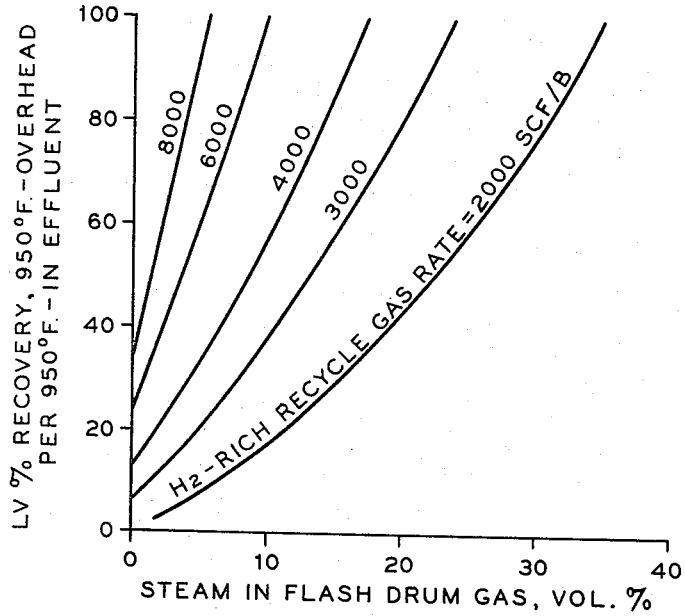
FIGURE 3 is a graph showing the effect an increase in the volume percent steam in the flash drum gas has on the LV percent recovery of the 950° F.-hydrocarbon fraction in the flash drum overhead with parameters of $H_2$-rich recycle gas rate.

Referring now to FIGURE 3, LV percent recovery was plotted against volume percent steam in the flash drum gas with parameters of hydrogen-rich recycle gas rates. FIGURE 3 is based on the data and an extension of these data from the 5 runs. FIGURE 3 indicates that at the minimum recycle gas rate of 2000 s.c.f. per barrel of normally liquid effluent about 35 volume percent steam is needed to obtain near 100 LV percent recovery. Thus, a definite limit is reached in the addition of steam to the flash drum gas above which no further advantage can be obtained. At a minimum recovery of about 10 LV percent, less than 7 volume percent steam is required at the minimum recycle gas rate of 2000 s.c.f. per barrel. The steam in the flash drum gas may be as low as 1 volume percent to obtain the minimum recovery of about 10 LV percent at a recycle gas rate of about 3,500 s.c.f. per barrel. The additional cost of the equipment needed to generate and circulate steam probably would make it uneconomical to add less than about 1 volume percent steam to the flash drum gas even though some benefit is obtained at less than 1 volume percent and at a recycle gas rate of greater than about 3500 s.c.f. per barrel.

The very beneficial effect that the addition of steam to the flash drum gas has on the LV percent recovery cannot be explained by equilibrium flash calculations. Such calculations indicate that steam has only a slight effect on the LV percent recovery. For example, at a recycle gas rate of 3000 s.c.f. per barrel, the calculated increase in recovery is only about 0.5 LV percent when the steam in the flash drum gas is increased from 0 to about 5 volume percent compared with an actual increase in recovery of about 14 LV percent.

The addition of steam to the separation zone gas results in a great reduction in the required recycle gas rate

TABLE II

| | Run | | | | |
|---|---|---|---|---|---|
| | 1 | 2 | 3 | 4 | 5 |
| Steam, wt. percent | 0 | 0 | 1 2 | 1 2 | 2 3 |
| Steam rate, pounds/b | 0 | 0 | 6.9 | 6.9 | 10.4 |
| $H_2$-Rich recycle gas rate, s.c.f./b.³ | 6,000 | 7,000 | 4,000 | 3,000 | 3,000 |
| Vol. percent 950° F., effluent | 70.9 | 70.2 | 67.1 | 78.5 | 74.9 |
| Avg. LV percent L.P. liquid removed per pass | 18.5 | 19.5 | 18 | 14.5 | 18.7 |
| LV percent recovery | 26.1 | 27.8 | 26.8 | 18.5 | 25.0 |
| LV percent pass conversion | 28.0 | 26.2 | 23.1 | 30.2 | 29.5 |

[1] 10 gm. $H_2O$ per 500 gm. combined feed to reactor.
[2] 15 gm. $H_2O$ per 500 gm. combined feed to reactor.
[3] Assume 1 barrel combined feed=1 barrel normally liquid effluent.

to obtain a given LV percent recovery. This in turn results in a great savings in purchase of heat exchangers, recycle compressors, furnaces and other equipment and a savings in the operating costs of the hydroconversion process.

These and other advantages are obtainable when operating in accordance with one of the foregoing methods of operation or with any of numerous variations that could be made in these methods without departing from the spirit of the invention, and all such variations that fall within the scope of the appended claims are intended to be embraced thereby.

I claim:

1. In a process for converting a hydrocarbon feed selected from the group consisting of petroleum distillates, petroleum residua and mixtures thereof having an end boiling point substantially above 950° F. to lower boiling products by subjecting said feed and at least 1000 s.c.f. of hydrogen per barrel of feed to a temperature in the range of about 700° to about 950° F. at a pressure in the range of about 1000 to 5000 p.s.i.g., in a hydroconversion zone and recovering from the effluent from said hydroconversion zone, products boiling below about 950° F. and higher boiling materials at least a portion of which is recycled to said hydroconversion zone, the improvement which comprises passing the effluent from said hydroconversion zone including effluent hydrogen into a separation zone, maintaining in said separation zone a temperature substantially the same as that in said hydroconversion zone and a pressure only slightly lower than that of said hydroconversion zone, introducing into said separation zone from about 6 to about 60 pounds of steam per barrel of normally liquid effluent entering said separation zone, withdrawing from the upper part of said separation zone a vapor mixture comprising hydrogen, steam and the hydrocarbon products, withdrawing from the lower part of said separation zone high boiling liquid hydrocarbons and recycling at least a portion of said liquid hydrocarbons to said hydroconversion zone.

2. A process as in claim 1 wherein said separation zone is a flash drum.

3. A process as in claim 1 wherein said separation zone is a stripping column.

4. In a process for converting a hydrocarbon feed selected from the group consisting of petroleum distillates, petroleum residua and mixtures thereof having an end boiling point substantially above 950° F. to lower boiling products by subjecting said feed and at least 1000 s.c.f. of hydrogen per barrel of feed with a hydrocracking catalyst to a temperature in the range of about 700° to 950° F. at a pressure in the range of about 1000 to 5000 p.s.i.g. in a hydrocracking zone and recovering from the effluent from said hydrocracking zone products boiling below about 950° F. and higher boiling materials a portion of which is recycled to said hydrocracking zone, the improvement which comprises passing the effluent from said hydrocracking zone including effluent hydrogen into a flash drum, maintaining said flash drum at a temperature substantially the same as that in said hydrocracking zone and a pressure only slightly lower than that of said hydrocracking zone, introducing into said flash drum from about 6 to about 60 pounds of steam per barrel of normally liquid effluent entering said flash drum, withdrawing from the upper part of said flash drum a vapor mixture comprising hydrogen, steam and the hydrocarbon products, withdrawing from the lower part of said flash drum high boiling liquid hydrocarbons and recycling a portion of said hydrocarbons to said hydrocracking zone.

5. A process as in claim 4 wherein the remainder of said liquid hydrocarbons is stripped in a stripping column with a stripping gas comprising about 2000 to about 8000 s.c.f. of a hydrogen-rich gas per barrel of said remainder entering said stripping column and from about 6 to about 60 pounds of steam per barrel of said remainder, wherein a vapor mixture comprising hydrogen, steam and the stripped hydrocarbon products is withdrawn from the upper part of said stripping column and wherein high boiling materials are withdrawn from the lower part of said stripping column.

6. A process as in claim 5 wherein at least a portion of said high boiling materials is recycled to said hydrocracking zone.

References Cited
UNITED STATES PATENTS

| | | | |
|---|---|---|---|
| 2,694,035 | 11/1954 | Smith et al. | 208—126 |
| 3,179,586 | 4/1965 | Honerkamp | 208—89 |
| 3,230,164 | 1/1966 | Williams et al. | 208—110 |
| 3,260,663 | 7/1966 | Inwood et al. | 208—80 |

ABRAHAM RIMENS, *Primary Examiner.*

DELBERT E. GANTZ, *Examiner.*